Oct. 24, 1961 C. PRASKY ET AL 3,005,690
MULTIPLE COMPARTMENT ROTARY DRUM FOR THE LEACHING OF
ORES OR RELATED PRODUCTS IN A CONTINUOUS
COUNTERCURRENT SYSTEM
Filed Jan. 15, 1960 2 Sheets-Sheet 1

INVENTORS.
CHARLES PRASKY
WILLARD S. SWANSON

BY
Ernest S. Cohen
ATTORNEY

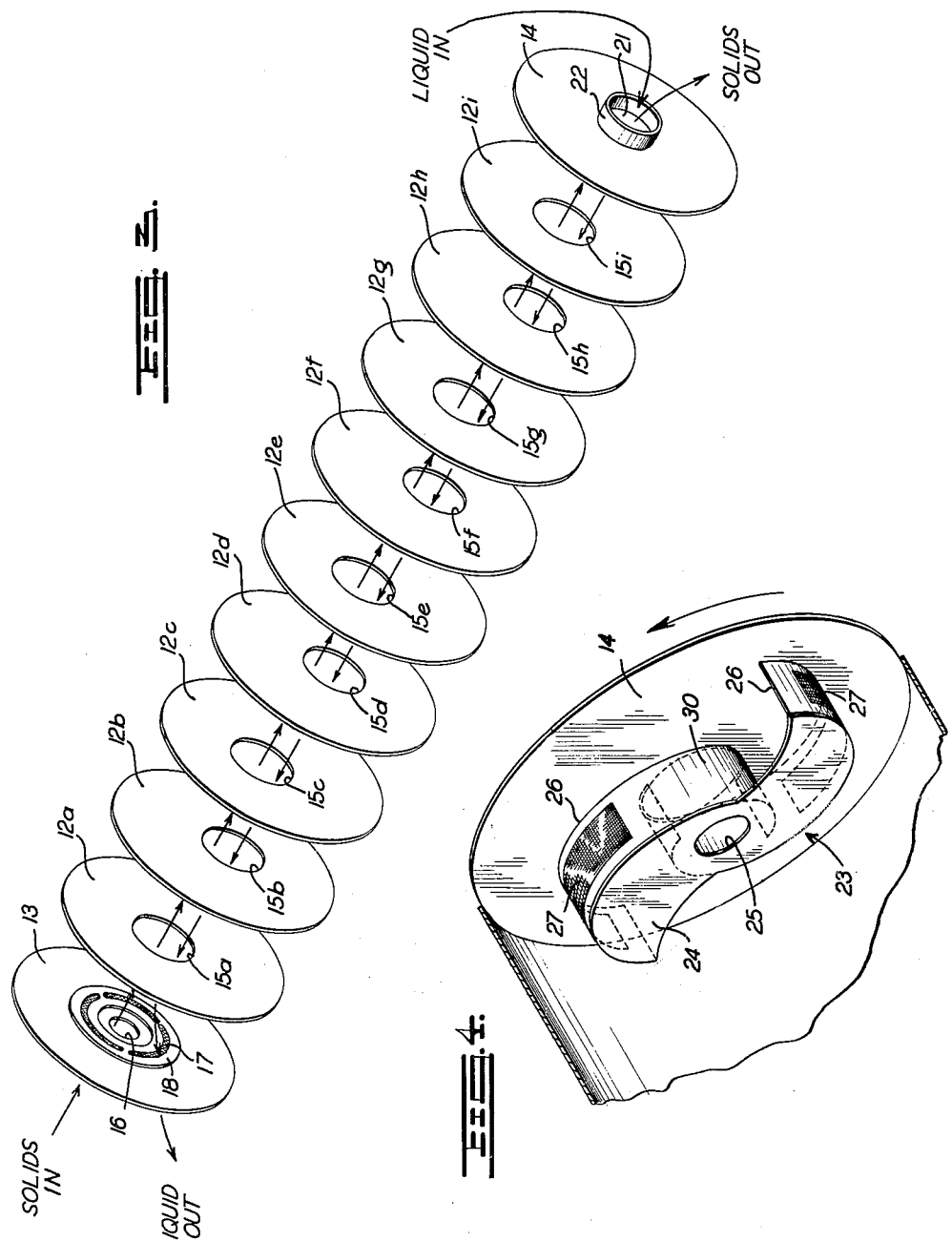

3,005,690
MULTIPLE COMPARTMENT ROTARY DRUM FOR THE LEACHING OF ORES OR RELATED PRODUCTS IN A CONTINUOUS COUNTERCURRENT SYSTEM

Charles Prasky and Willard S. Swanson, Minneapolis, Minn., assignors to the United States of America as represented by the Secretary of the Interior
Filed Jan. 15, 1960, Ser. No. 2,791
3 Claims. (Cl. 23—269)
(Granted under Title 35, U.S. Code (1952), sec. 266)

The invention herein described and claimed may be manufactured and used by or for the Government of the United States of America for governmental purposes without the payment of royalties thereon or therefor.

This invention relates to apparatus for bringing solids into intimate contact with liquids. More particularly it relates to an apparatus for the continuous countercurrent leaching, working, or extracting of a granular solid with a suitable liquid.

It is an object of this invention to provide an improved rotary-type apparatus for continuously bringing into intimate contact solid particulate material with liquid or liquids. More particularly, it is an object of this invention to provide an apparatus for continuously extracting a soluble component from a particulate solid mixture in which the liquid solvent and the solid move countercurrently through the apparatus.

It is a further object of this invention to provide a rotary leaching apparatus which is divided into a plurality of chambers, each of these chambers communicating with its neighbor by an off-center opening.

Further objects and advantages will become apparent from a consideration of the detailed description of the invention as given below, together with the appended claims.

Briefly, the invention consists of an elongated hollow cylinder divided into a plurality of compartments by transverse disks. Each disk is pierced by an eccentric opening and so arranged that the centers of the openings in adjacent disks are diametrically opposed. The cylinder is mounted horizontally and rotates about its longitudinal axis. Finely divided solids, such as comminuted ores, are fed in at one end, while liquid solvent, e.g. water or dilute acid, is fed in at the other. The solid material travels through the cylinder, passing from compartment to compartment and is discharged at one end, while pregnant liquor is removed from the opposite end. Thus, the solids and liquids move in opposite directions, the arrangement of the apparatus being such that the liquid remains in contact with the solids an appreciable time. Each compartment serves as a separate leaching chamber, and obviates the need for a series of leaching drums.

Figure 1:
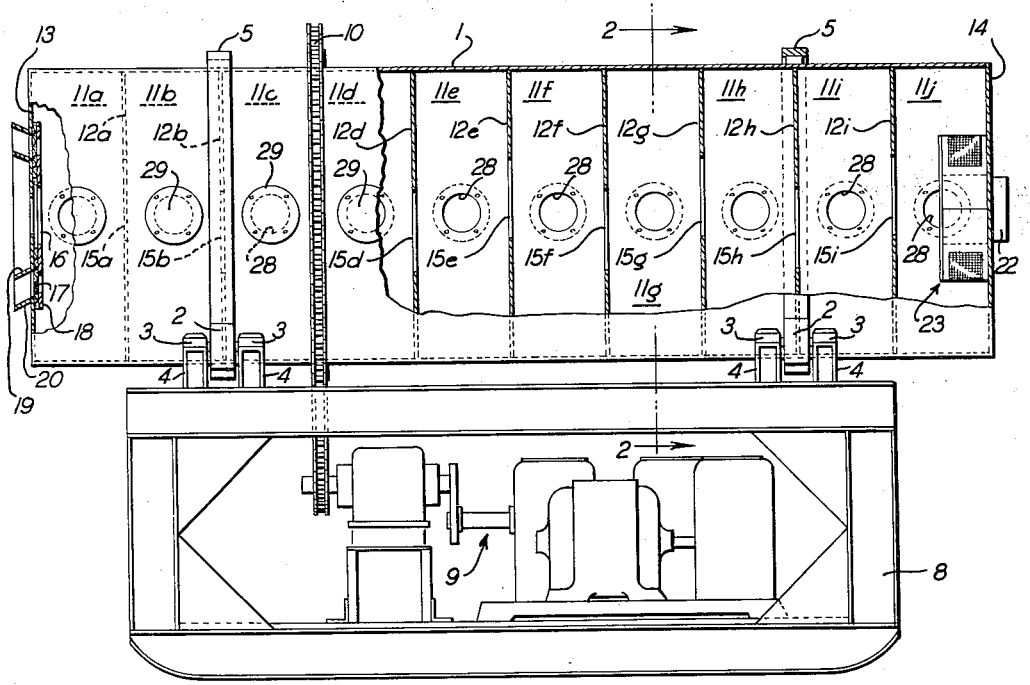
Figure 2:
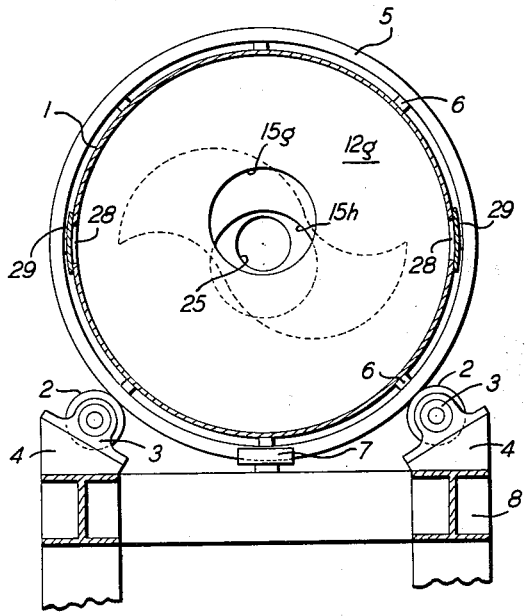
Figure 3:
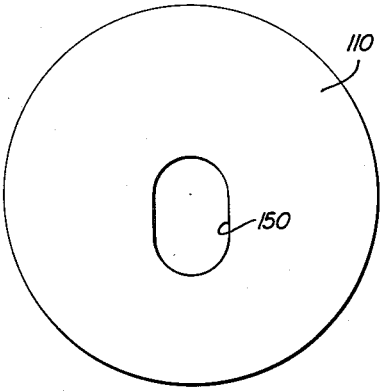

One form of apparatus according to this invention is illustrated in the accompanying drawing in which FIG. 1 is a front elevation, partly in section, of the leaching drum and associated driving mechanism. FIG. 2 is a sectional view of the drum taken along line 2—2 of FIG. 1, showing one compartment. FIG. 3 is a schematic isometric view showing the eccentric arrangement of openings in the plates and indicating the path of solids and leach liquids. FIG. 4 is a cut-away view of the solid exit portion of the drum, showing the scoop arms and drainage screens. FIG. 5 is a plan view of a modified separator.

Like reference numerals refer to like parts in the different figures of the drawing.

Referring to the drawing, cylindrical vessel 1 is mounted horizontally for rotation by means of a plurality of rollers 2 mounted in pillow blocks 3 which in turn are fastened to plates 4. Supporting rollers 2 bear against the rims of tires 5, which are connected to vessel 1 by means of spacers 6 as shown best in FIG. 2.

Plates 4 are mounted on a supporting framework designated generally as 8, within which is located drive mechanism 9 comprising an electric motor, reducers and a linkbelt drive. Since these elements are conventional and well known to the art they need not be described further.

Thrust rollers 7 mounted on frame 8 contact the sides of both tires 5, a pair of such rollers to each tire, whereby longitudinal movement of the vessel is prevented.

Vessel 1 is rotated by means of a chain and sprocket shown generally at 10 connected operatively to the drive mechanism 9. As shown in FIG. 1 the interior of vessel 1 is divided into a plurality of substantially equal compartments 11a to 11j by equally spaced disk-like separators 12, which are designated serially as 12a to 12i in FIG. 1, and by end plates 13 and 14. Each of the separators 12a to 12i has an eccentric circular hole through its face, designated correspondingly with the separators as 15a to 15i, and as shown in FIGS. 1 and 2, the separators are so disposed as to have their holes alternatively turned 180° on axis. In the embodiment shown ten compartments are employed, but it is to be understood that the number can be varied as required, and that they may be of unequal volumes.

Instead of circular holes in the separating plates, other geometrical shapes may be employed as shown in the modification pictured in FIG. 5, wherein plate 110 is shown with an off-center oval opening 150.

End plate 13 has a central opening 16 therein, and annular concentric opening spaced radially from 16 and covered over by a screen 17. The latter is fastened to the inner face of 13 by a plate 18 which is attached to plate 12 in any conventional manner. Opening 16, as shown in the FIGS. 1 and 3 of the drawing, is smaller than openings 15a to 15i in separators 12a to 12i. Plate 18 has openings in register with the concentric openings in plate 12, so that liquids can pass through screen 17 and be filtered.

A pair of inner and outer concentric truncated conical members, 19 and 20, are fastened to the outer face of plate 13 and surround the opening screened by 17. The annular space between the conical members provides a path for the flow of liquids from vessel 1, as will appear more fully below.

Plate 14 has a central opening 21, smaller than openings 15a to 15h, and has mounted on its outer face, surrounding the opening, a concentric collar 22, which serves as a discharge spout. At the inner face of plate 14, as shown in FIG. 4, is mounted a scoop designated generally as 23. Scoop 23 has a generally winged-shaped face 24 having a central opening 25, which is smaller than opening 21, and a pair of arcuate scoop blades 26. The bottom portion of the blades have a screened portion 27 for filtering or drainage purposes.

Access to the individual compartments in vessel 1 is provided by ports 28 covered by plates 29, which are bolted to the vessel surface. In the embodiment shown, each compartment has two ports, but only one port may be employed if desired.

The operation of the disclosed leaching drum is as follows: Solid material having a soluble component is force-fed into the vessel through central opening 16 of end plate 13. This may be done in any convenient manner, such as a gravity feed hopper, for example. Solvent liquid, capable of dissolving the soluble component of the solid material to be treated, is admitted into vessel 1 through openings 21 and 25. As the drum rotates slowly about its horizontal axis of rotation, which may be at about .5 r.p.m., the solid material is charged into compartment 11a.

When the amount of solids present in the compartment exceeds a quantity determined by the geometry of the vessel, the size and position of hole 15a, and the angle of repose of the material, a portion spills over into the next adjacent compartment when the eccentric opening is at its low point. As the solids are continuously fed into the vessel through 16, each of the compartments becomes charged in turn with solids and the net effect is a movement of the solid particles in the direction indicated in FIG. 3.

At the same time, leaching liquid is introduced into compartment 11j through openings 21 and 25 by a pipe or tubing (not shown), and becomes distributed through all the compartments. The slow rotation of vessel 1 causes a constant tumbling and mixing action of the solids and liquid, resulting in a very thorough leaching. Liquid charged with dissolved material is constantly removed from the compartment by passing through screen 16 and the annular conduit formed by conical elements 19 and 20.

From compartment 11j on the right end of vessel 1 the solid material is removed by means of the rotating scoop 23, as best seen in FIG. 4. As the scoop rotates, it lifts up some of the solids, causes them to pass them over screen 26 where the liquid drains off. Continued rotation in the direction of the arrow moves them into a hub-like portion 30 of the scoop. As more solids are deposited in the hub, the angle of repose becomes exceeded, and they slide out through conduit 21 into any conventional storage means, such as a bin (not shown).

One non-limiting example of the use to which the device may be put is in the continuous countercurrent leaching of water-soluble manganese sulfate from manganese carbonate slates and lean oxidized manganiferous ores which have been previously treated by a sulfur dioxide air-roast process. By making the vessel and separators out of corrosive-resistant materials acid saline, or alkaline leaches may be employed. While a circular cylinder is shown as the vessel, other shapes, such as rectangular or oval tanks may be employed.

Although particular embodiments of the present invention have been disclosed and described, it is to be understood that we are not to be limited thereby, and only such limitations should be imposed as are indicated in the appended claims.

We claim:

1. An apparatus for treating solid particulate material with liquids which comprises, a vessel having a generally horizontal axis of rotation, means for rotating said vessel about said axis, interior partitions in said vessel dividing said vessel into a series of open and unobstructed compartments, a pair of terminal end plates on said vessel, each of the terminal end plates having a central opening therein, each of said partitions having a flush opening therein spaced from the periphery of the vessel, the center of said opening being spaced from the axis of rotation, the partitions being arranged so that the openings in adjacent partitions are angularly displaced from each other relative to the axis of rotation of the vessel, means for feeding liquid into the vessel through one end plate opening, means for feeding solid particulate material into the vessel through the other end plate opening, said terminal end plate opening means being smaller than the opening in the partitions, filtering means for removing enriched liquid through the said other end plate, filtering means for removing treated solid particulate material through the said one end plate.

2. An apparatus for treating solid particulate material with liquids which comprises, a cylindrical vessel disposed generally horizontally and having a horizontal axis of rotation, means for rotating said vessel about the said axis of rotation, a plurality of parallel disk-like interior partitions disposed normally to the axis of rotation within said vessel, a pair of terminal end plates on said vessel, whereby the vessel is divided into a plurality of open and unobstructed compartments, each of said terminal end plates having a central opening therein, each of said partitions having a flush circular opening the center of which is spaced from the axis of rotation of the vessel, said partition being disposed within the vessel so that the centers of the circular opening of adjacent partitions are displaced 180° from each other relative to the axis of rotation of the vessel, means for feeding liquid into the vessel through one end plate opening, means for feeding solid particulate material into the vessel through the other end plate opening, said terminal end plate openings being smaller than the opening in the partitions, filtering means for removing enriched liquid through the said other end plate, and filtering means for removing treated solid particulate material through the said one end plate.

3. An apparatus for treating solid particulate material with liquids which comprises, a cylindrical vessel disposed generally horizontally and having a horizontal axis of rotation, means for rotating said vessel about the said axis of rotation, a plurality of parallel disk-like interior partitions disposed normally to the axis of rotation of the vessel and spaced equidistantly within said vessel, a pair of terminal end plates on said vessel, whereby the vessel is divided into a plurality of substantially equal and open compartments, said compartments being unobstructed, each of said partitions having a flush circular opening, the center of which is spaced from the axis of rotation of the vessel, each of the terminal end plates having a central opening therein, said partitions being disposed within the vessel so that the centers of the circular opening of adjacent partitions are displaced 180° from each other relative to the axis of rotation of the vessel, means for feeding liquid into the vessel through one end plate opening, means for feeding solid particulate material into the vessel through the other end plate opening, said terminal end plate openings being smaller than the opening in the partitions, filtering means for removing enriched liquid through the said other end plate, means including foraminous scoop means rotatable with said vessel and adapted to drain and discharge the solid particulate material through the said end plate.

References Cited in the file of this patent

UNITED STATES PATENTS 2,337,137     Thompson et al.     Dec. 21, 1943